(12) United States Patent
Bahls et al.

(10) Patent No.: US 8,938,527 B2
(45) Date of Patent: Jan. 20, 2015

(54) METHOD AND DEVICE FOR DATA PROCESSING IN A COMMUNICATION NETWORK

(75) Inventors: Thomas Bahls, Greifswald (DE); Daniel Duchow, Neubrandenburg (DE)

(73) Assignee: Adtran GmbH, Berlin-Siemensstadt (DE)

( * ) Notice: Subject to any disclaimer, the term of this patent is extended or adjusted under 35 U.S.C. 154(b) by 175 days.

(21) Appl. No.: 13/262,693

(22) PCT Filed: Mar. 25, 2010

(86) PCT No.: PCT/EP2010/053921
§ 371 (c)(1),
(2), (4) Date: Oct. 28, 2011

(87) PCT Pub. No.: WO2010/112399
PCT Pub. Date: Oct. 7, 2010

(65) Prior Publication Data
US 2012/0124188 A1    May 17, 2012

(30) Foreign Application Priority Data
Apr. 1, 2009    (EP) ..................................... 09100217

(51) Int. Cl.
*G06F 15/173* (2006.01)
*H04L 29/06* (2006.01)
(Continued)

(52) U.S. Cl.
CPC ....... *H04L 63/0263* (2013.01); *H04L 29/06591* (2013.01); *H04L 12/2874* (2013.01); *H04L 12/2881* (2013.01); *H04L 47/20* (2013.01)
USPC ............ 709/223; 709/224; 709/225; 709/226

(58) Field of Classification Search
CPC ............ H04L 12/2874; H04L 12/2881; H04L 29/06591; H04L 47/20
See application file for complete search history.

(56) References Cited

U.S. PATENT DOCUMENTS

| 6,154,775 A | 11/2000 | Coss et al. |
| 6,606,710 B2 * | 8/2003 | Krishnan et al. ................. 726/13 |
| 7,177,930 B1 * | 2/2007 | LoPresti ....................... 709/224 |

(Continued)

FOREIGN PATENT DOCUMENTS

| EP | 0 910 197 A2 | 4/1999 |
| EP | 1 006 701 A2 | 6/2000 |

(Continued)

OTHER PUBLICATIONS

Acharya, et al., "Traffic-Aware Firewall Optimization Strategies", 2006 IEEE International Conference on Communications, Jun. 11-15, 2006, vol. 9, Istanbul, Turkey (http://www2.research.att.com/~ jiawang/icc06.pdf).

*Primary Examiner* — Dhairya A Patel
(74) *Attorney, Agent, or Firm* — Laurence A. Greenberg; Werner H. Stemer; Ralph E. Locher

(57) ABSTRACT

A method and a device for data processing in a communication network. The method includes the following steps: (i) at least one filter applicable for a first type of connection is provided in front of at least one filter that is applicable for a second type of connection; and (ii) the order of the at least on filter applicable for the first type of connection and the at least one filter applicable for the second type of connection is inverted in case that the number of filters required for the second type of connection increases.

17 Claims, 3 Drawing Sheets

(51) Int. Cl.
*H04L 12/28* (2006.01)
*H04L 12/813* (2013.01)

(56) References Cited

U.S. PATENT DOCUMENTS

2007/0140273 A1* 6/2007 Kubota .................. 370/401
2007/0297432 A1* 12/2007 Christenson ............ 370/412
2008/0040439 A1* 2/2008 Wang ..................... 709/206
2008/0301798 A1* 12/2008 Hao et al. ................ 726/13
2009/0047968 A1 2/2009 Gunnarsson et al.
2010/0070760 A1 3/2010 Vanderveen et al.

FOREIGN PATENT DOCUMENTS

| | | |
|---|---|---|
| JP | 2005301891 A | 10/2005 |
| JP | 2009077030 A | 4/2009 |
| JP | 2011512045 A | 4/2011 |

* cited by examiner

METHOD AND DEVICE FOR DATA PROCESSING IN A COMMUNICATION NETWORK

BACKGROUND OF THE INVENTION

Field of the Invention

The invention relates to a method and to a device for data processing in a communication network.

The approach described herein in particular relates to data switching as provided by network nodes, e.g., IP DSLAMs or Ethernet switches. Such data switching may require filters to be used for conveying portions of the switched traffic towards a control plane, e.g., a built-in processing stage. Devices conducting such services may be a DHCP relay, an IGMP proxy or a snooper.

A problem arises in case control-plane communication is to be forwarded via software (after being directed to the processing stage) while other data is forwarded via wire-speed hardware (without considerable delay compared to the software processing). Hence, the data forwarded without software processing may arrive earlier at a destination than the data processed in the control-plane, even if the first type of data arrived later at the network node, which may mix up the order of the data expected at the destination.

It is also a disadvantage that filtering at the control-plane is rather restricted due to the limited filtering resources available at the network node providing the data switching services. Limited filtering resources may impact a scalability of a service provided. A filter set may comprise positive or negative filters, one of them providing an optimized resource usage while achieving the same functionality in both ways, depending on number and type of the filters.

E.g., carrier Ethernet equipment intercepts certain protocol-related frames in the data path and acts upon them. Typical examples comprise ARP, DHCP, PPPoE, and IGMP. Such interceptions are done by means of filters in data-path switching devices, e.g., chips. Filtering resources are typically limited in their capabilities and number available. Also, intercepting packets and possibly redirecting them to, e.g., an attached host processor may result in disordered data at the receiver.

BRIEF SUMMARY OF THE INVENTION

The problem to be solved is to overcome the disadvantages mentioned above and in particular to allow for an efficient utilization of the resources of a network node, e.g., said resources providing a filter functionality of the network node.

This problem is solved according to the features of the independent claims. Further embodiments result from the depending claims.

In order to overcome this problem, a method for data processing in a communication network is suggested,
  wherein at least one filter applicable for a first type of connection is provided prior to at least one filter applicable for a second type of connection,
  wherein the order of the at least on filter applicable for the first type of connection and the at least one filter applicable for the second type of connection is inverted in case the number of filters required for the second type of connection increases.

A type of connection may be a group of connections that comprises or is associated with at least one connection. The filter may thus be applicable to at least one connection and an action for such at least one connection can be triggered as set forth by said filter.

A filter or a type of filter may be associated with at least one action that is triggered in case a condition set forth by such filter is met. Different actions can be assigned to a filter, in particular during runtime, i.e. a filter may be triggered by a first data and provide a first action when being configured with a first setup. It may be triggered by a second data and provide a second action when being configured with a second setup, and so forth. It is also possible that the same filters provide different actions.

Due to the fact that the filters are provided in a particular order, said filters being applicable for different types of connections, the at least one filter applicable for the first type of connection refers to said first type of connection prior to the at least one filter applicable for the second type of connection.

Hence, the first type of connection is filtered out by said at least one filter applicable for the first type of connection. When the data to be processed reaches a filter applicable for the second type of connection, the first type of connection may have yet been completely filtered out.

In case the order of the filters is swapped (hence processing connections of the second type of connection prior to the first type of connection), the filtering criteria applicable need to address this second type of connection first and need to filter out the second type of connection prior to processing the filters applicable for the first type of connection. Hence, the at least one filter applicable for the first type of connection does not have to address the type of connection as such (because the second type of connection has already been triggered upon, e.g., filtered out, when it comes to this filter applicable for the first type of connection).

It is noted that the order of the at least one filter applicable for the first type of connection and the at least one filter applicable for the second type of connection may be inverted in case the number of filters required for the second type of connection equals or is larger than the number of filters required for the first type of connection.

In an embodiment, the at least one filter being prior to the at least one other filter comprises the type of connection to be selected and the at least one other filter does not mention its type of connection.

Hence the at least one other filter may be realized as a default filter or as a catch-all filter. It is noted that type of connection may refer to a type of connection or type of data that is processed by at least one filter.

Advantageously, the at least one filter mentioned first may explicitly refer to the type of connection, wherein the at least one other filter does not have to refer to the inverse type of connection, because the type of connection referred to by the at least one filter mentioned first has already been filtered out. Hence, the remaining connections are inverse to the type of connection mentioned by the at least one filter mentioned first.

In another embodiment, the order is inverted automatically and/or in case the number of filters required for the second type of connection reaches a predetermined threshold.

Such inversion could be achieved, e.g., interactively by reconfiguring the filter database or automatically based on a threshold mechanism.

In a further embodiment, the first type of connection is one of the following:
  a transparent connection;
  a non-transparent connection.

Advantageously, transparent connections may not be subject to processing on a control-plane of a network node.

Instead, such transparent connections may be forwarded immediately to a destination, e.g., a next network element or node, a CPE or a CO. However, non-transparent connections may be processed by the control-plane of the network node and may be forwarded after such processing has been conducted.

In a next embodiment, the second type of connection is not of the first type of connection.

In particular, the first and the second types of connections may be disjoint to one another. However, this concept also applies for several (more than two) disjoint connections, i.e. a first type of connection, then a second type of connection can be addressed an filtered out. The remaining connections refer to a (disjoint) third type of connection. However, this third type of connection does not have to be mentioned by the filters at this stage, because all other (first and second) connections have already been processed by a different filtering stage.

It is also an embodiment that the order is inverted during runtime of a network node.

Hence, the network node may change the order of the filters and apply different filter functionality during runtime. This may in particular be of advantage in case one type of connection requires a significantly different amount of filters compared to the other type of connection.

According to a further embodiment, the at least one filter applicable for the first type of connection and the at least one second filter applicable for the second type of connection are reconfigured after the order has been inverted.

Hence, threshold values may automatically trigger the inversion of the order of filters and thus the reconfiguration of the filters after they have been re-ordered. Optionally, the thresholds can be determined automatically and a restructuring of the order of filters can be triggered based on such threshold. Also, thresholds may be manually set, e.g., by a user or by an operator.

Said reconfiguration is processed for efficiency reasons, i.e. dependent as how the filters available can be utilized in a most efficient way.

Pursuant to another embodiment, connections are separated by identifiers, said identifiers being associated with at least one of the following:
 VLANs, in particular VLAN IDs;
 MAC addresses;
 IP addresses;
 UDP addresses;
 MPLS labels.

Hence, any such identifiers can be used to identify different connections. Based on this information, the type of connection can be determined.

According to an embodiment, said data processing is conducted by a network node, in particular at least partially on a control-plane of said network node.

According to another embodiment, an order of data to be forwarded to a destination is maintained by dropping second data that arrived after first data, but would otherwise be forwarded prior to the first data.

Hence, it is efficiently avoided that said second data arriving after the first data overtakes the first data and reaches the destination prior to the first data thereby leading to a disorientation of the destination, e.g., a receiver that may in such case not be able to set up or maintain a connection.

In yet another embodiment, said first data is processed in a control-plane of the network node.

Hence, the delay resulting from the additional processing of the first data in the control plane can be efficiently compensated by dropping second data that otherwise would have overtaken the first data.

According to a next embodiment, an order of data to be forwarded to a destination is maintained by buffering and processing said data in the correct order that is expected by the destination.

Hence, a correct order can be maintained in case first and second data are processed in the control-plane of the network node.

Pursuant to yet an embodiment, an order of data to be forwarded to a destination is maintained by maintaining an address learning mechanism at the network node and forwarding only such data to the destination for which an address entry is available.

According to a further embodiment, said address learning mechanism comprises a MAC learning mechanism.

Such MAC learning mechanism may be controlled via software. Then, conditions can be reached that avoid forwarding of data that would otherwise inadmissibly overtake data that needs to arrive first at a destination, because corresponding MAC entries for the otherwise overtaking data are not yet available. This efficiently avoids such overtaking of data arriving later than previous data that are required to provide said MAC entries. Hence, the forwarding mechanism is efficiently tuned by such MAC learning.

The problem stated above is also solved by a device comprising a and/or being associated with a processor unit and/or a hard-wired circuit and/or a logic device that is arranged such that the method as described herein is executable thereon.

According to an embodiment, said device is a communication device, in particular a or being associated with a network node, a switching device, an IP DSLAM or an Ethernet switch.

The problem stated supra is further solved by a communication system comprising the device as described herein.

Embodiments of the invention are shown and illustrated in the following figures:

DESCRIPTION OF THE INVENTION

Figure 1:
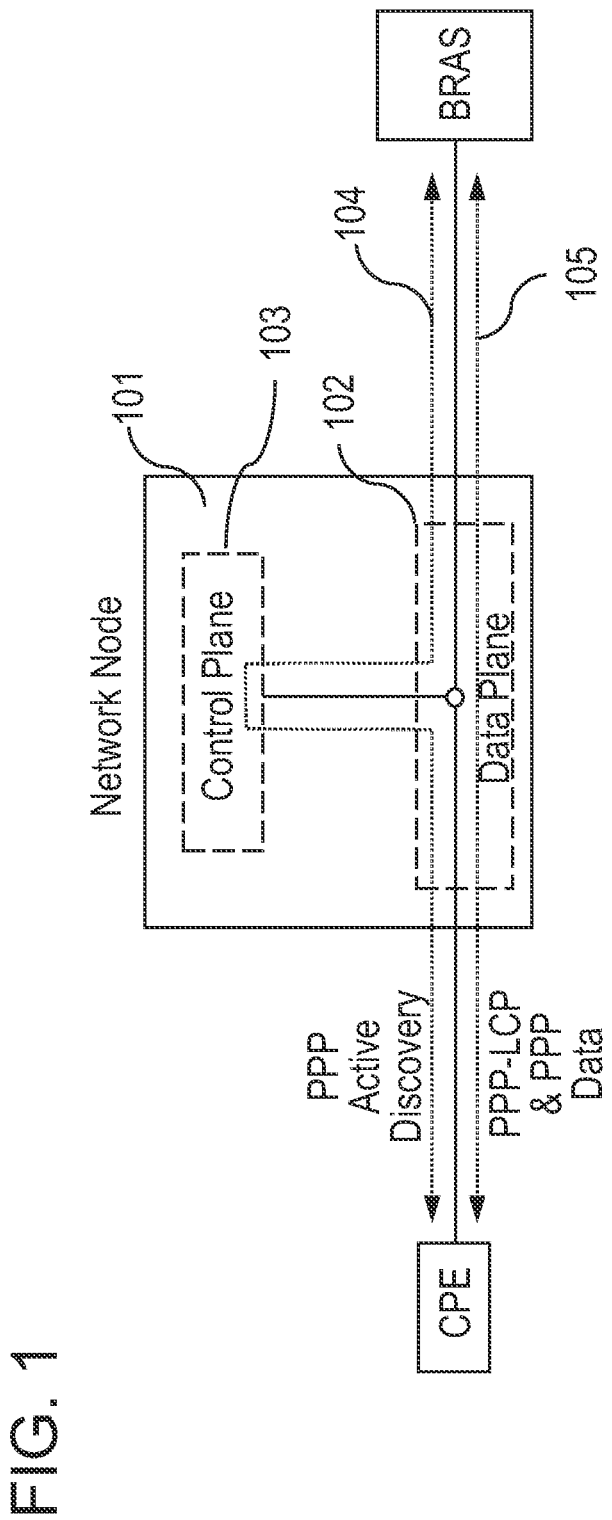
FIG. 1 shows a diagram of a CPE connected to a BRAS via a network node, wherein the network node comprises a data plane and a control plane, with a first type of traffic being conveyed between the CPE and the BRAS via the control plane and a second type of traffic being conveyed via between the CPE and the BRAS via the data plane only.

FIG. 1 shows a diagram of a CPE connected to a BRAS via a network node 101. The network node 101 may provide switching service and can be, e.g., an IP DSLAM or an Ethernet switch. The network node 101 comprises a data plane 102 and a control plane 103, wherein a first type of traffic 104 is conveyed between the CPE and the BRAS via the control plane 103 and a second type of traffic 105 is conveyed between the CPE and the BRAS via the data plane only. The first type of traffic 104 may comprise PPP Active Discovery messaging and the second type of traffic 105 may comprise PPP-LCP and/or PPP Data traffic.

Figure 2:
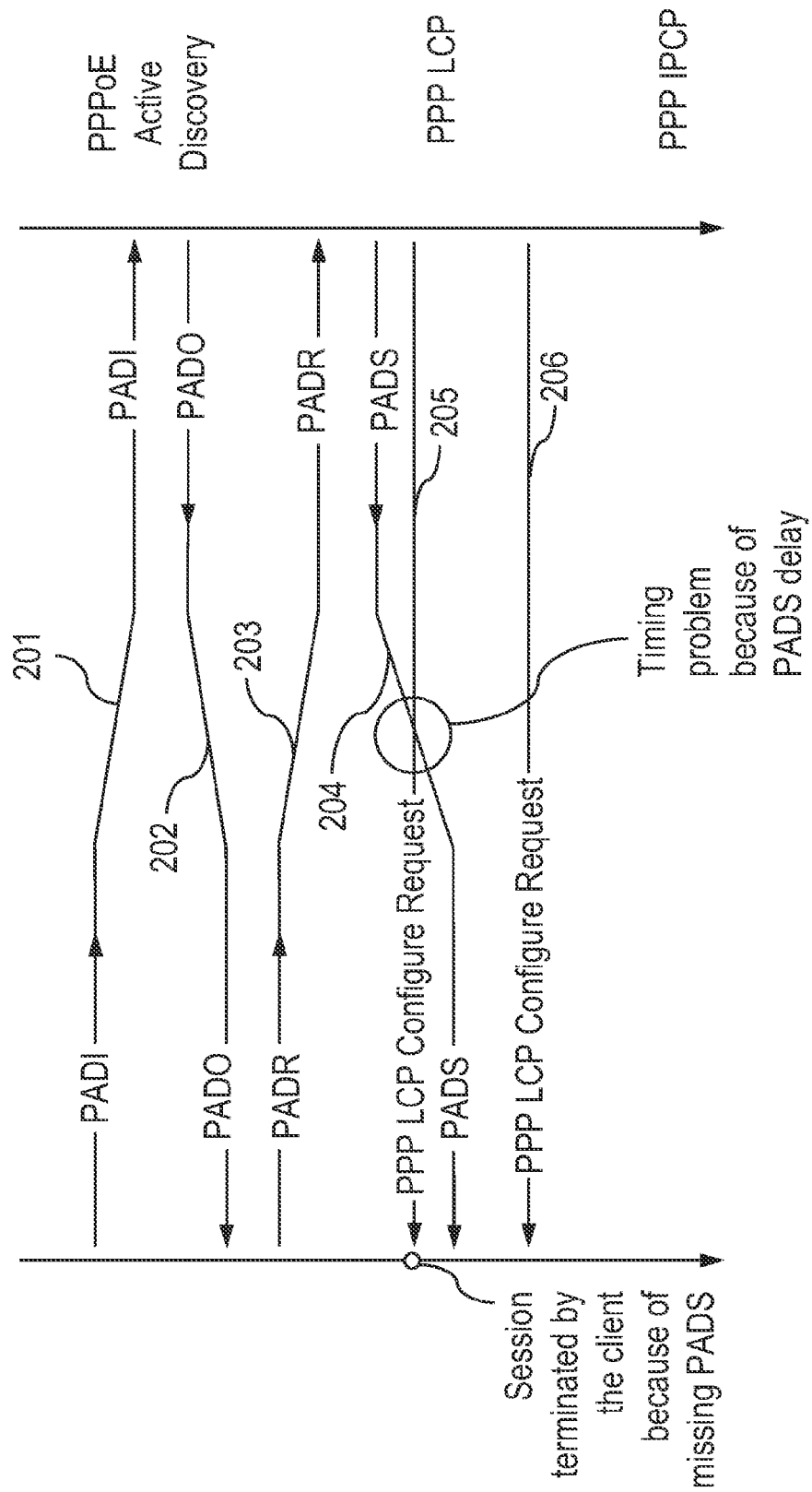
FIG. 2 shows a message sequence chart comprising messages exchanged between the CPE and the BRAS via the network node as shown in FIG. 1.

FIG. 2 shows a message sequence chart comprising messages exchanged between the CPE and the BRAS via the network node 101 as shown in FIG. 1.

Protocol operations in PPPoE comprise a session setup phase and the session phase itself. Typically, the session setup phase can be distinguished from the session phase to an extent that only the session setup is redirected via filtering to the control plane software.

A PADI message 201 is conveyed from the CPE to the BRAS. Then, a PADO message 202 is conveyed from the BRAS to the CPE. Subsequently, a PADR message 203 is transmitted from the CPE towards the BRAS and a PDAS message 204 is sent from the BRAS to the CPE. These messages 201 to 204 refer to a PPPoE Active Discovery phase, which is concluded after the PADS message 204 was successfully received at the CPE.

However, after having sent the PADS message 204, the BRAS initiates a PPP LCP phase by sending a PPP LCP Configure Request 205 to the CPE, which may arrive at the CPE sooner than the PADS message 204. This results in a session termination at the CPE, because of the missing PADS message based on the PADS message delay due to processing reasons at the control plane of the network node 101.

Hence, the PADS message 204 is still processed in software while the PPP LCP Configure Request 205 is switched in wire speed overtaking the PADS message 204. Thus, communication endpoints may become confused by such reordered communication and they may lose the ability to establish the session at all.

A resource aspect of this approach also relates to capabilities of said network nodes, e.g., data-path forwarding devices such as Ethernet switches. The network node may provide filters operable at wire-speed and may utilize such filters in a flexible way. For example, an EtherType value of 0×8863 could trigger a PPPoE session setup phase, the associated action being "redirect to controller". Such filter capabilities may be limited by the number of such filters; a specific utilization of a network node may require for more triggers than filters being available in hardware.

A disordered messaging aspect can be resolved in a number of ways. The following paragraphs relate to options to avoid an earlier message taking over a subsequent message:

(1) As a first option, an overtaking portion of a communication can be identified and dropped with a temporary trigger. This can be done dependent on the actual connection.
   For example, LCP packets could be identified by their type and a "drop" action dismissing the traffic could be bound to such temporary trigger. According to the example of FIG. 2, once the PADS message 204 will be sent, the drop filter could be removed.

(2) As a second a temporary trigger could be provided to queue the overtaking portion of a communication and to forward the communication in the right order to the destination.
   For example, a scope of the trigger could be temporarily changed, the trigger may refer to all PPPoE frames and not just the session setup phase as long as no session has yet been established. Once the session is established, the trigger can be removed for the session phase.
   Hence, all communication can be processed by the control plane and the control plane (e.g., the software running on the network node) may provide forwarding the traffic in the correct order.

(3) It is a third option that during MAC address learning (in case of Ethernet switching) in a software-controlled way, the respective MAC addresses could be installed in a forwarding data base after having successfully processed the PADS message. Any communication arriving in the meantime may be blocked by the network node, because of its missing MAC forwarding entry.
   This variant depends on the default forwarding behavior "deny" or "drop" instead of "flood" for unknown MAC addresses. In Carrier Ethernet environments, this assumption is typically valid.

Scalabilty/Filter

A scalability aspect can be met by processing logic changes of the filters at runtime in the switching device.

A typical filter setup may deal with a variety of connections, some of which are to be transparent while others are not. When active, filters for the respective control-plane protocols may ignore any transparent connection, i.e. in such scenario, they react on non-transparent connections only.

Connections can be identified and/or (logically) separated by VLANs. As an alternative or as an option, a filter could be configured not to redirect to control plane but to forward immediately instead, thereby preventing the respective data from being processed.

In case a filtering is done per connection, a predetermined configuration may require a certain number of filters, in particular said filters being ordered in a given sequence according to which they may or may not be activated (i.e. the respective filter condition may or may not be met).

A filter functionality or filter rule may apply for one convection or a group of connections (e.g., via a masking technique) and binds an action to such at least one connection.

In an exemplary configuration, a first filter may be applicable to those connections that are to be transparent and it may trigger an action "forward" to the transparent traffic (e.g., without any further processing by the control-plane). Next, all filters for non-transparent connections may follow (as the transparent connection are yet covered by the first filter), triggering an action "redirect to software" to such non-transparent traffic.

Multiplying the number of connections (usually in the order of thousands) with the potential number of separate control-plane protocols may result in a number of filters required that are typically beyond the number of filters available in a network node, e.g., a switching device. Hence an efficient approach is suggested to cope with a limited number of filters in an efficient way:

(a1) Enumerate all filters for transparent connections and Trigger such filters prior to any remaining filters that are not applicable to the transparent connections.

(b1) Provide at least one subsequent filter applicable for all non-transparent connections, but without referring to the type of connection in the trigger (a default action or catch all-type of filter).
   For example, this subsequent filter may apply to all PPPoE session setup traffic of all (remaining) VLANs; the VLANs do not have to be addressed in the filter, because the transparent VLANs have already been filtered and processed by the first filter. Hence, only non-transparent VLANs (or other kind of traffic that has not been filtered by the first filter) is subject to this subsequent filter.
   Hence, one filter is required for this group of connections only. If transparent connections are added, filters can be inserted prior to this step (b1).

However, this approach may also inflict scalability problems regarding the number of filters available, e.g., based on a growing and changing configuration during runtime. If the number of transparent connections increases, the number of filters consumed may reach a limit (e.g., an upper threshold), wherein the non-transparent connections may decrease and the grouping effect for such non-transparent connections may be reduced. In such a situation, an inverse logic could be applied, i.e., steps (a1) and (b1) above can be exchanged with regard to the type of connection:

(a2) Enumerate all filters for non-transparent connections and trigger such filters prior to any remaining filters that are not applicable to the non-transparent connections.

(b2) Provide at least one subsequent filter applicable for all transparent connections without referring to the type of connection in the trigger. Such transparent traffic (i.e. the "rest") may, e.g., be forwarded.

Hence, one filter is required for this group of connections only. If non-transparent connections are added, filters can be inserted prior to this step (b2).

This step (b2) could be conducted in a no-match situation regarding the filters applied in step (a2), i.e. in case no filter of (a2) is applicable. Then, a default action (e.g., forwarding) may apply.

Such change of filtering logic, i.e., switching between (a1), (b1) and (a2), (b2), could be provided automatically or it may be subject to configuration, e.g., by a user.

If this change of filtering logic is done automatically, threshold values may be set for initiating the inverse logic at runtime, or could be determined from other connection configurations automatically, and reconfigure the filtering database accordingly.

The solution described herein may also apply to a "half-transparent" connections, i.e. a connection that is transparent for one set of protocols, but it is non-transparent for another set of protocols. Each such set may comprise at least one protocol. The approach suggested allows handling of half-transparent connections in particular due to its efficient utilization of the filters available in the network node.

Figure 3:
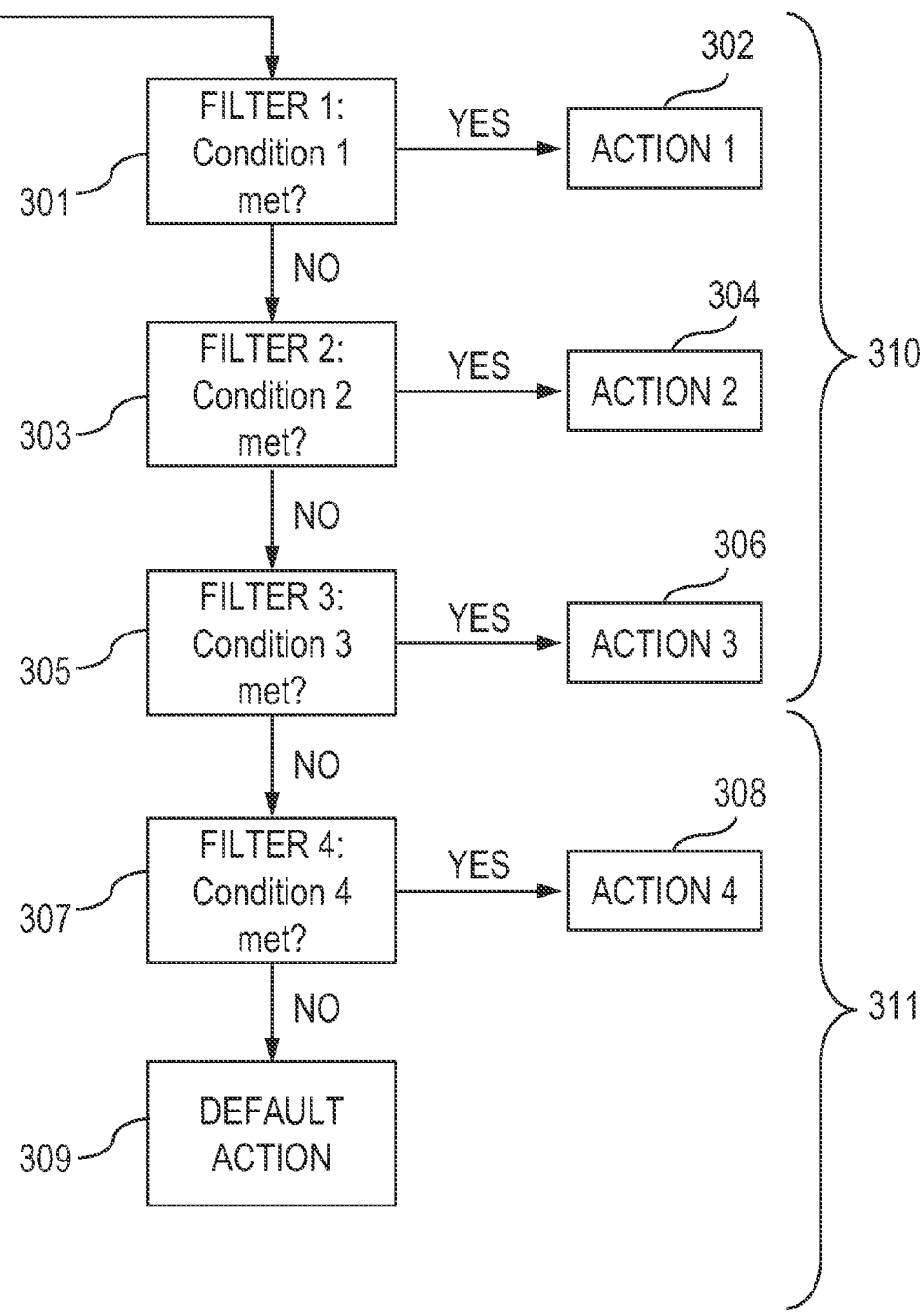
FIG. 3 shows a flow chart comprising several filters, wherein each filter triggers an action and the filters are arranged in sequence such that in case a filter condition of a particular filter matches, the remaining filters of the sequence will not be reached.

FIG. 3 shows a flow chart comprising several filters 301, 303, 305, 307, wherein each filter 301, 303, 305, 307 triggers an action 302, 304, 306, 308. The filters 301, 303, 305, 307 are arranged in sequence and in case a filter condition of a particular filter 301, 303, 305, 307 is met, the remaining filters of the sequence will not be reached. Each filter 301, 303, 305, 307 comprises a condition and it is checked whether or not such condition is met. In the affirmative, the respective action 302, 304, 306, 308 is performed. If not, the subsequent filter is processed. For the last filter 307, if the condition is not met, a default action 309 is conducted. In the example of FIG. 2, the sequence of filters 301, 303 and 305 are used for a first type of connection 310 (e.g., transparent connections) and the remaining filter 307 and the default action may thus apply for connections that are not considered "first type", i.e. a second type of connection 311 (e.g., non-transparent connections).

LIST OF ABBREVIATIONS

ARP Address Resolution Protocol
BRAS Broadband Remote Access Server
CO Central Office
CPE Customer Premises Equipment
DHCP Dynamic Host Configuration Protocol
DSL Digital Subscriber Line
DSLAM Digital Subscriber Line Access Multiplexer
IGMP Internet Group Management Protocol
IP Internet Protocol
LAN Local Area Network
LCP Link Control Protocol
MAC Media Access Control
PADI PPPoE Active Discovery Initiation
PADO PPPoE Active Discovery Offer
PADR PPPoE Active Discovery Request
PADS PPPoE Active Discovery Session-confirmation
PPP Point-to-Point Protocol
PPPoE PPP over Ethernet
VLAN Virtual LAN

The invention claimed is:

1. A data processing method carried out by a network node in a communication network, the method which comprises:
   providing at least one filter applicable for a first type of connection prior to at least one filter applicable for a second type of connection;
   inverting an order of the at least one filter applicable for the first type of connection and the at least one filter applicable for the second type of connection when a number of filters required for the second type of connection increases; and
   maintaining an order of data to be forwarded to a destination by dropping second data that arrived after first data, but would otherwise be forwarded prior to the first data.

2. The method according to claim 1, wherein the at least one filter that is prior to the at least one other filter comprises a type of connection to be selected and the at least one other filter does not mention a type of connection thereof.

3. The method according to claim 1, which comprises inverting the order automatically and/or in case the number of filters required for the second type of connection reaches a predetermined threshold.

4. The method according to claim 1, wherein the first type of connection is a transparent connection.

5. The method according to claim 1, wherein the first type of connection is a non-transparent connection.

6. The method according to claim 1, wherein the second type of connection is not a first type of connection.

7. The method according to claim 1, which comprises reconfiguring the at least one filter applicable for the first type of connection and the at least one second filter applicable for the second type of connection have been inverted.

8. The method according to claim 1, wherein the connections are separated identifiers and the identifiers re associated with at least one of the following:
   VLANs;
   MAC addresses;
   IP addresses;
   UDP addresses;
   MPLS labels.

9. The method according to claim 8, wherein the VLANs are VLAN IDs.

10. The method according to claim 1, which comprises carrying out the data processing at least partially on a control plane of the network node.

11. The method according to claim 1, which comprises processing the first data in a control-plan of the network node.

12. The method according to claim 1, which comprises maintaining an order of data to be forwarded to a destination by buffering and processing the data in a correct order that is expected by the destination.

13. The method according to claim 1, which comprises maintaining an order of data to be forwarded to a destination by maintaining an address learning mechanism at the network node and forwarding only such data to the destination for which an address entry is available.

14. The method according to claim 13, wherein the address learning mechanism comprises a MAC learning mechanism.

15. In a communication network, a data processing device of a network node, comprising:
   at least one processing apparatus selected from the group consisting of a processor unit, a hard-wired circuit, and a logic device configured to execute a method including the steps of:

providing at least one filter applicable for a first type of connection prior to at least one filter applicable for a second type of connection;

inverting an order of the at least one filter applicable for the first type of connection and the at least one filter applicable for the second type of connection when a number of filters required for the second type of connection increases; and maintaining an order of data to be forwarded to a destination by dropping second data that arrived after first data, but would otherwise be forwarded prior to the first data.

16. The data processing device according to claim 15, wherein the apparatus is a communication device.

17. The data processing device according to claim 15, wherein the apparatus is, or is associated with, a network node, a switching device, an IP DSLAM, or an Ethernet switch.

* * * * *